Patented Mar. 24, 1953

2,632,741

UNITED STATES PATENT OFFICE 2,632,741

FIRE-RESISTANT COATING COMPOSITION

Lewis W. Eckert, Lancaster Township, Lancaster County, Pa., assignor to Armstrong Cork Company, Lancaster, Pa., a corporation of Pennsylvania No Drawing. Application January 19, 1952, Serial No. 267,308

8 Claims. (Cl. 260—17.3)

This invention relates to a fire-resistant coating composition. The composition is particularly useful on fiberboard and the like including acoustical units, panel, plank, and tile elements, as well as other members which are installed as decorative interior finishes. The composition may be used on other materials, however.

Insulating materials such as the fiber products referred to above are frequently made from organic fibers such as wood, and the finished product is capable of supporting combustion and burns quite rapidly when ignited. In order to effectively render such products resistant to fire, a nonflammable coating may be applied; and a coating which intumesces and cokes upon the application of a flame to form a heat-insulating carbon deposit which will prevent the transfer of heat to the flammable body of the board and thus prevent its ignition is preferred to those fireproofing materials which impregnate the fibers throughout the extent of the board. In acoustical materials, where there are provided closely spaced openings which extend from the surface of the board inwardly, there is the problem of preventing the applied flame from igniting the fibers within the openings. Here, a coating material which will intumesce to a degree adequate to bridge effectively the openings in the board is preferred.

With many products, particularly those used for interior finishes, it is desirable to provide a surface which may be washed when occasion arises without deterioration of the coating or its removal.

An object of the present invention is to provide a coating composition for fiberboard and the like which will intumesce and coke upon the application of a flame; the coating composition, being essentially non-flammable, upon intumescence and coking protecting the product to which it is applied against ignition.

A further object of the invention is to provide a fire-resistant coating composition which will possess adequate washability for general use of the material on products intended for interior finishing of buildings and the like.

An additional object of the invention is to provide a coating composition which will possess a high intumescence factor and which will coke upon the application of a flame, the same being particularly useful in coating perforated acoustical materials such as fiberboard.

Other objects of the invention will become apparent from the description of a specific embodiment of the invention which follows.

According to the present invention, a dicyandiamide-aldehyde resin is reacted with starch by mixing starch and water with a dicyandiamide-aldehyde resin and heating the resulting mixture to effect the desired reaction. The reaction product thus formed is then combined with monocalcium phosphate and preferably also with phosphoric acid to produce a fire-resistant coating composition which will coke and intumesce to a substantial degree upon the application of a flame. The composition may, of course, include pigments and fillers, conventional fungus-proofing agents, levelling agents, and the like. The starch-resin combination has binding properties and serves to hold the coating firmly anchored to the surface to which it is applied. This may be supplemented by other binders such as gelled starch obtained by heating a 15% dispersion of starch in water to a temperature of about 190° F. and cooling to about 140° F. or lower prior to combination with the other ingredients. Many other supplementary binders may be used, although for most uses none is required.

The dicyandiamide-aldehyde resin may be prepared as follows:

Example I

| | Parts by weight |
|---|---|
| Dicyandiamide | 22 |
| Formaldehyde (37% solution) | 71 |
| Phosphoric acid | 7 |

The formaldehyde and dicyandiamide are mixed together for about two minutes, and then the phosphoric acid is added. The acid serves as a catalyst for the reaction. Reaction between the formaldehyde and dicyandiamide is continued until a clear solution is obtained. The reaction vessel is jacketed; and cooling water is applied to maintain the temperature of the reaction below about 120° F. and preferably at a temperature of about 90° F. to 105° F. With a batch such as referred to above, the reaction will be effected in about one hour's time. In place of formaldehyde, other aldehyde-yielding substances may be substituted; such, for example, as acetaldehyde, paraformaldehyde, benzaldehyde, and hexamethylenetetramine; and the term "aldehyde" is used in the claims to cover all such aldehyde-yielding substances.

The proportioning of dicyandiamide to formaldehyde preferably should be in the range of 1 mol of dicyandiamide to 2 to 3 mols of formaldehyde. An excess of aldehyde may be present without deleterious results, but there should be adequate aldehyde in the reaction mixture to combine with substantially all of the dicyandiamide.

The resin thus prepared is employed in the formation of a heat reaction product with starch, in the following manner:

Example II

| | Parts by weight |
|---|---|
| Dry ungelled starch | 37.8 |
| Dicyandiamide-aldehyde resin | 40.0 |
| Water | 213.0 |

The ingredients are mixed together and the mass is heated with agitation to elevate the temperature to about 190 F., and such temperature is maintained for thirty minutes. The temperature and duration of treatment may be varied. Generally similar results will be achieved by heating for a shorter time at 200° F. than at 190° F., and at 180° F. a longer heating time will be required. About 200° F. is the maximum temperature of treatment desirable and 180° F. may be considered a reasonable minimum, below which the treating time would be too long to be of any commercial interest. Improvement in the final product will be noted with heating for as little as five minutes at 190° F. There is believed to be a reaction between the starch and the resin; and it is known that the final product possesses better washability than a similar coating composition prepared from a simple mixture of dicyandiamide-aldehyde resin and starch, particularly when the product is applied to fiberboard and dried for about two and one-half to four minutes at 350° F. It appears that the curing of the coating in the drying oven is accelerated by initial reaction of the dicyandiamide-aldehyde resin with the starch. Also improved intumescence is provided in the finished coating over that obtained with a mixture of starch and dicyandiamide-aldehyde resin.

A coating composition may be prepared from the material of Example II with other ingredients as follows:

Example III

| | Parts by Weight | Resin Solids | Starch Solids |
|---|---|---|---|
| 1. Monocalcium Phosphate | 72.0 | | |
| 2. Phosphoric Acid | 17.5 | | |
| 3. Sodium Pentachlorophenate | 1.6 | | |
| 4. Water | 70.0 | | |
| 5. Reaction Product of Example II | 96.0 | 7.3 | 12.3 |
| 6. Titanium Dioxide Dispersion (50% solids) | 15.0 | | |
| 7. Iceberg Clay | 22.5 | | |
| 8. Pine Oil | 1.6 | | |
| 9. Quadrofos (Sodium Tetraphosphate) | 1.2 | | |
| 10. Mica Filler | 13.0 | | |
| 11. Dry Ungelled Starch | 73.0 | | 73.0 |
| 12. Resin of Example I | 40.5 | 22.0 | |
| 13. Water | 30.0 | | |

In the preparation of the coating composition, ingredients 1 to 4 are mixed together to produce a dispersion of the monocalcium phospate and other ingredients in water. A dispersion of titanium dioxide in water is also prepared, and it and the remaining ingredients are added to the monocalcium phosphate dispersion and mixing is continued until a uniform product is obtained.

In the composition of Example III the monocalcium phosphate is a water-insoluble salt which fireproofs the starch of the composition; being water-insoluble, it minimizes the possibility of paint failure which might occur under high humidity conditions. The monocalcium phosphate is unreacted and is chemically stable in the dispersion. Because of the reactivity of the monocalcium phosphate with alkaline materials to produce gases, the composition must be substantially free of any such alkaline ingredients which would so react with the monocalcium phosphate; for when the monocalcium phosphate is thus reacted, the effectiveness of the fire-resistant coating composition is lost.

The phosphoric acid is also a fireproofing ingredient and serves to combine with the starch and the reaction product of Example II to produce an intumescence in the composition upon the application of a flame. The phosphoric acid may be incorporated in large quantities without deleterious results; but where cost is an important factor, the amount of phosphoric acid used will be relatively small.

The sodium pentachlorophenate is a conventional fungicide, and other similar materials may be substituted for it, or it may be omitted. The titanium dioxide, iceberg clay, and mica are fillers and pigments, and the quantity of these materials incorporated is not critical. In fact, where pigmentation is not essential and where a filler is not required, they may be omitted entirely. The pine oil is a wetting agent and helps to level the composition. It also serves as a defoaming agent and thus assists in the preparation and use of the composition. The Quadrofos is a dispersing agent which serves its usual purpose.

It will be noted that the composition of Example III includes in addition to the reaction product of Example II a further quantity of the resin of Example I, together with dry ungelled starch. It has been found that it is not essential to have all of the starch and resin reacted in order to obtain the improved results. Even small quantities of the reaction product will impart improved characteristics to the coating material. Where all of the resin and starch are reacted, a relatively hard coating composition results upon drying and curing of the material. This may be undesirable in some instances. In Example III optimum characteristics have been obtained for fiberboard usage, eliminating any objectionable hardness, by reacting about 25% of the resin on a solids basis with about 15% of the starch, also on a solids basis. For commercial use on fiberboard, at least about 10% of the resin on a solids basis should be reacted with about 15% of the starch on a solids basis.

The preferred starch is converted coating starch, a chlorinated starch such as Pennick and Ford Company's T. S. C. starch. Other so-called "thin boiling starches" may be substituted. Pearl starch may be used, or mixtures of pearl starch and thin boiling starch may be employed. The starch is defined as "an amylaceous material selected from the group consisting of thin boiling starch, pearl starch, and mixtures thereof." The total starch content to the monocalcium phosphate should fall in the range between 3 parts of starch to 1 part of monocalcium phosphate as the maximum starch content and 1 part of starch to 1 part of monocalcium phosphate as the minimum starch content. The optimum starch content as given in Example III is 1.18 parts of starch for each 1 part of monocalcium phosphate.

The amount of phosphoric acid to be used in the composition is not critical; although, as mentioned above, it does play a substantial part in providing intumescence in the product. Preferably, it is incorporated in the range of 5 to 100 parts of phosphoric acid for each 100 parts of monocalcium phosphate. In the preferred composition of Example III, the ratio is about 24 parts of phosphoric acid for each 100 parts of monocalcium phosphate.

When 25 grams of the coating composition of Example III are applied per square foot to a perforated fiberboard acoustical unit, the same will meet the requirements of Section E-3c of "Federal Specification SSA-118a" when tested in accordance with the procedure outlined in F-3c of that specification. The coating does not substantially reduce the sound-absorption efficiency of the product; and when dried at a temperature in the order of 350° F. for about two and one-half to four minutes, the surface is tack-free, smooth, and free of checks and cracks and meets the washability requirements of "Federal Specification TTP-88a."

In my copending application Serial No. 267,310, filed January 19, 1952, and entitled "Fire-Resistant Coating Composition for Fiberboard and the Like" there is disclosed and claimed a fire-resistant coating composition including monocalcium phosphate, starch, and a binder, and among the binders is included dicyandiamide-aldehyde resin.

I claim:

1. A fire-resistant coating composition for fiberboard and the like comprising a mixture of (1) monocalcium phosphate and (2) the reaction product of a mixture of (a) an amylaceous material selected from the group consisting of thin boiling starch, pearl starch, and mixtures thereof and (b) a dicyandiamide-aldehyde resin obtained by heating said amylaceous material and dicyandiamide-aldehyde resin mixture at a temperature of at least 180° F.

2. A fire-resistant coating composition for fiberboard and the like comprising a mixture of (1) monocalcium phosphate and (2) the reaction product of a mixture of (a) an amylaceous material selected from the group consisting of thin boiling starch, pearl starch, and mixtures thereof and (b) a dicyandiamide-aldehyde resin obtained by heating said amylaceous material and dicyandiamide-aldehyde resin mixture the equivalent of at least five minutes at 190° F.

3. A fire-resistant coating composition for fiberboard and the like comprising a mixture of (1) monocalcium phosphate and (2) the reaction product of a mixture of (a) an amylaceous material selected from the group consisting of thin boiling starch, pearl starch, and mixtures thereof and (b) a dicyandiamide-aldehyde resin obtained by heating said amylaceous material and dicyandiamide-aldehyde resin mixture the equivalent of about thirty minutes at 190° F.

4. A fire-resistant coating composition for fiberboard and the like comprising a mixture of (1) monocalcium phosphate, (2) the reaction product of a mixture of (a) an amylaceous material selected from the group consisting of thin boiling starch, pearl starch, and mixtures thereof and (b) a dicyandiamide-aldehyde resin obtained by heating said amylaceous material and dicyandiamide-aldehyde resin mixture at a temperature of at least 180° F., and (3) phosphoric acid.

5. A fire-resistant coating composition for fiberboard and the like comprising a mixture of (1) monocalcium phosphate, (2) an amylaceous material selected from the group consisting of thin boiling starch, pearl starch, and mixtures thereof, (3) a dicyandiamide-aldehyde resin, (4) phosphoric acid, and (5) the reaction product of a mixture of ingredients (2) and (3) obtained by heating the same the equivalent of at least five minutes at 190° F.

6. A fire-resistant coating composition in accordance with claim 5 in which at least 10% of the total dicyandiamide-aldehyde resin in the composition is reacted with at least 15% of the starch in the composition.

7. A fire-resistant coating composition in accordance with claim 6 in which the reaction product is obtained by heating the named materials at a temperature between about 180° F. and 200° F.

8. A fire-resistant coating composition for fiberboard and the like comprising a mixture of (1) monocalcium phosphate, (2) from 1 to 3 parts by dry weight of an amylaceous material selected from the group consisting of thin boiling starch, pearl starch, and mixtures thereof for each part of monocalcium phosphate, (3) a dicyandiamide-aldehyde resin, and (4) phosphoric acid, at least 10% of said resin and 15% of said amylaceous material being reacted by heating a mixture of said ingredients the equivalent of about five to thirty minutes at 190° F.

LEWIS W. ECKERT.

No references cited.